Oct. 3, 1967  H. L. HALL  3,345,052
METHOD AND MEANS OF CALCINING LIMESTONE
Filed Oct. 14, 1966  6 Sheets-Sheet 1

INVENTOR.
HUBERT L. HALL
BY
Shenier & O'Connor
ATTORNEYS

Oct. 3, 1967  H. L. HALL  3,345,052
METHOD AND MEANS OF CALCINING LIMESTONE
Filed Oct. 14, 1966  6 Sheets-Sheet 2

INVENTOR.
HUBERT L. HALL
BY
Shenier & O'Connor
ATTORNEYS

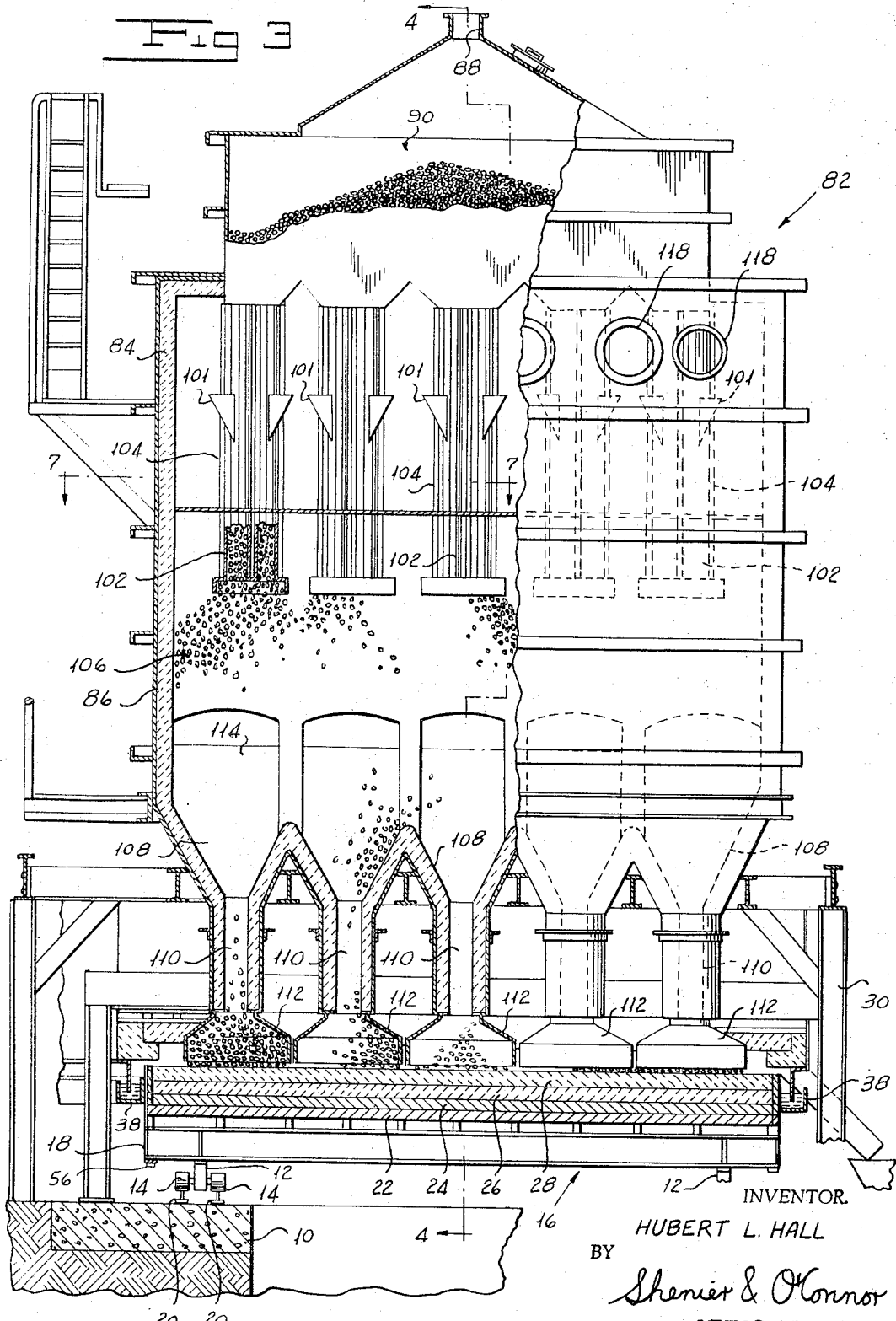

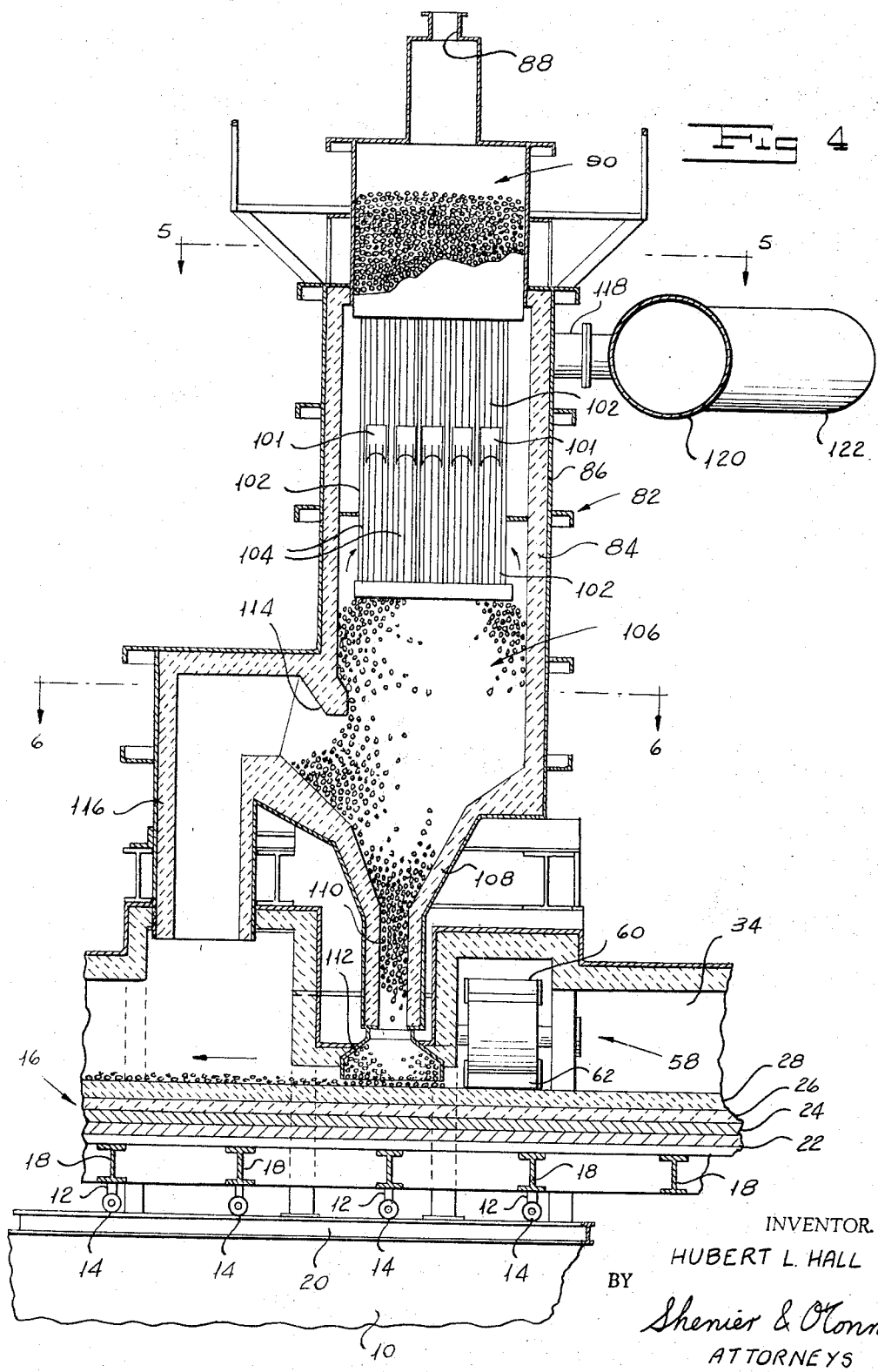

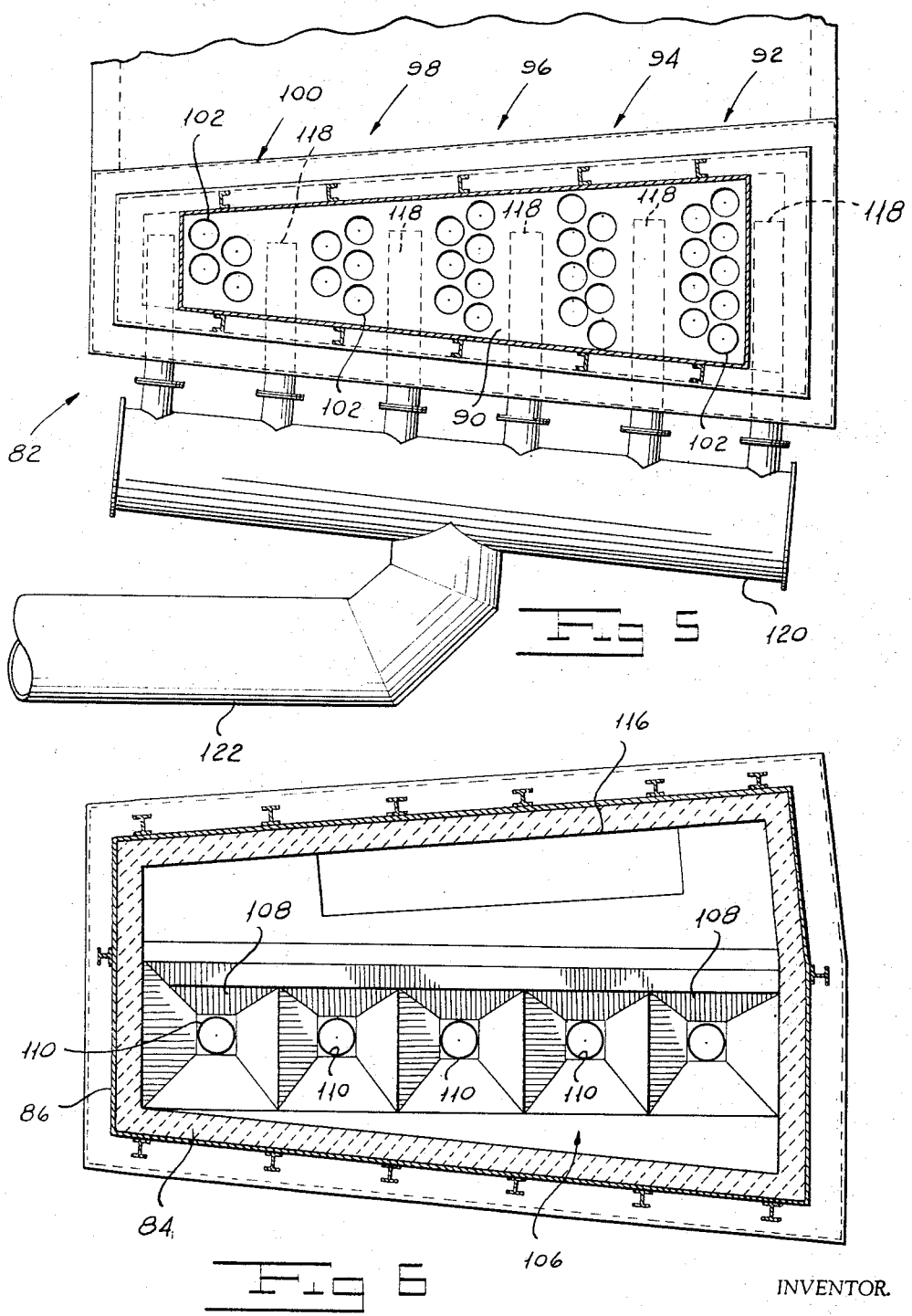

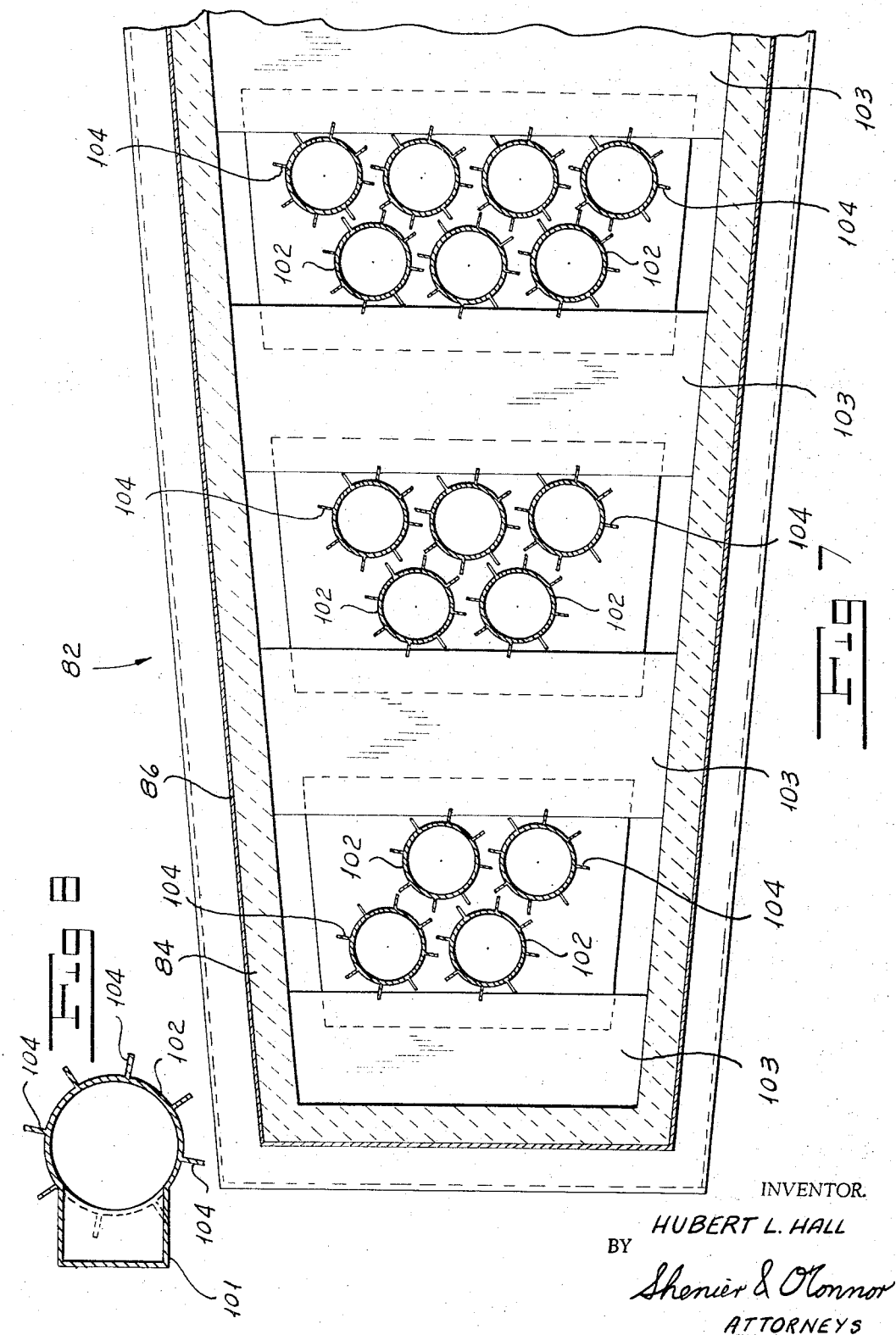

United States Patent Office 3,345,052
Patented Oct. 3, 1967

3,345,052
METHOD AND MEANS OF CALCINING LIMESTONE
Hubert L. Hall, Toronto, Canada, assignor, by mesne assignments, to Calcimatic International Ltd., Nassau, Bahamas, a corporation of the Bahamas
Continuation of application Ser. No. 344,012, Feb. 11, 1964. This application Oct. 14, 1966, Ser. No. 586,897
7 Claims. (Cl. 263—27)

ABSTRACT OF THE DISCLOSURE

A process for calcining limestone to produce lime having a sulphur content of less than about 0.03% by weight in which the limestone charge is first subjecetd in indirect heat exchange in an elongated confined zone with exhaust gases at a temperature of below about 650° F. and then is subjected to direct heat exchange with exhaust gases at a temperature above about 650° F. The apparatus comprises elongated heat exchange tubes through which the limestone first passes, the tubes being provided with turnover boxes and the apparatus including baffles between groups of the heat exchange tubes to direct hot gases into contact with the tubes of the groups.

This application is a continuation of my copending application Ser. No. 344,012, filed Feb. 11, 1964, now abandoned.

My invention relates to an improved method of an apparatus for calcining limestone and more particularly to a method and means for producing lime having a very low sulphur content.

As is known in the prior art, limestone, which is largely calcium carbonate, is reduced to lime or calcium oxide by subjecting the limestone to a high heat for a predetermined period of time. The resulting lime has a wide variety of uses. For example, it is used in the production of steel. One highly efficient modern method of making steel is by the oxygen lance method, as in the Brassert oxygen furnace, which reduces ore at a very rapid rate as compared with other processes.

Almost all limestone contains some percentage of sulphur which usually runs about 0.09% by weight of the limestone. One of the requirements when using the Brassert furnace is that the lime employed have a very low sulphur content of less than about 0.03% by weight of the lime.

My prior patent, No. 3,050,298, discloses a calcining means and method for breaking limestone down to produce lime. One step of the process disclosed therein is the use of the hot gases of combustion to preheat the charge of limestone being fed to the rotary hearth. I have discovered that if I employ the method and apparatus shown in my prior patent without preheating the limestone with exhaust gas, I am able to produce lime having a percentage of sulphur of only about 0.015%. While lime having this sulphur content would be satisfactory for use in the oxygen lance method of steel making, the fuel economy in that method of producing lime is so poor as to make the process impracticably expensive. Moreover, I have also discovered that if the charge of limestone being fed to the hearth is not preheated, the stone spalls and cracks and is thus degraded when it hits the high temperature rotary hearth in the calcining zone. Thus, not only is the fuel economy extremely poor but also there is a large loss of limestone if the process is practiced without preheating the limestone with exhaust gases. For these reasons, in order for the process to be practicable, it is necessary to heat the limestone charge being fed to the hearth. However, when the charge is preheated in this manner, the resultant lime is found to have a sulphur content of 0.098% by weight which is entirely unsuitable for use in the steel producing method described above.

The exhaust gases in the process disclosed in my prior patent are at a temperature of about 1000° F. I have discovered that the limestone must be preheated to above a minimum temperature of about 250° F. to prevent degradation of the stone by spalling and cracking. I have further discovered that if exhaust gases at a temperature of below about 650° F. are brought into contact with the limestone being fed to the hearth, the resulting lime has an excessively high sulphur content. If, on the other hand, the temperature of the exhaust gases to which the limestone is subjected is above about 650° F., no sulphur apparently is deposited and the resulting lime has a very low sulphur content.

I have invented an improved method of calcining limestone which is more efficient than are methods of the prior art. My improved method results in lime having a very low sulphur content while at the same time avoiding spalling and cracking of the limestone. My method produces a lime which is especially suited for use in the oxygen lance method of making steel. I have also invented apparatus for carrying out my improved method.

One object of my invention is to provide an improved method for calcining limestone which is more efficient than are methods of the prior art.

Another object of my invention is to provide a method of calcining limestone to produce lime having a very low sulphur content while at the same time avoiding spalling and cracking of the limestone.

A further object of my invention is to provide an improved method of calcining limestone to produce lime which is especially suited for use in the oxygen lance method of making steel.

Other and further objects of my invention will appear from the following description.

In general my invention contemplates the provision of an improved method of calcining limestone in which I subject the limestone charge to the temperature of the exhaust gases in two stages as it is fed to the hearth. In the first stage the exhaust gases at a temperature of above about 650° F. are brought directly into contact with the limestone adjacent the hearth. In the second stage heat exchangers subject the charge being fed to the temperature of the exhaust gases at below about 650° F. while preventing contact between the gases and the limestone.

In the accompanying drawings which form part of the instant specification and which are to be read in conjunction therewith and in which like reference numerals are used to indicate like parts in the various views:

FIGURE 3 is a sectional view of my apparatus for practicing my improved method with parts broken away.

FIGURE 4 is a sectional view of the form of my apparatus shown in FIGURE 3 and taken along the line 4—4 of FIGURE 3.

FIGURE 5 is a sectional view of the form of my apparatus shown in FIGURE 4 and taken along the line 5—5 of FIGURE 4.

FIGURE 6 is a sectional view of the form of my apparatus shown in FIGURE 4 taken along the line 6—6 of FIGURE 4.

FIGURE 7 is a sectional view of some of the heat exchange tubes of my apparatus to show the arrangement of the fins and baffles thereof.

FIGURE 8 is a sectional view of one of the heat exchange tubes of my apparatus illustrating a stone turnover box formed in the tube.

Figure 1:
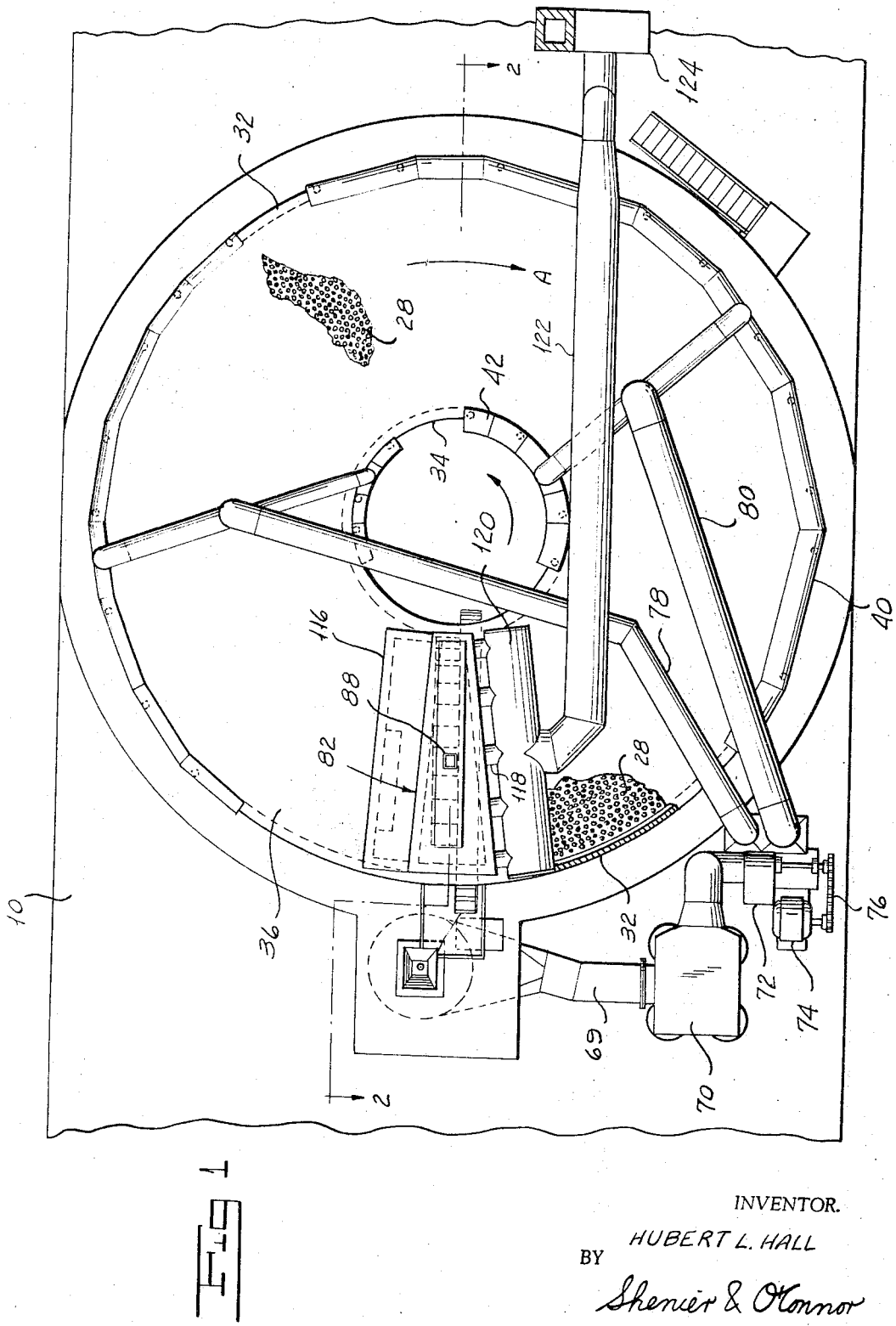
FIGURE 1 is a top plan view of one form of my apparatus for practicing my improved method of calcining limestone.
Figure 2:
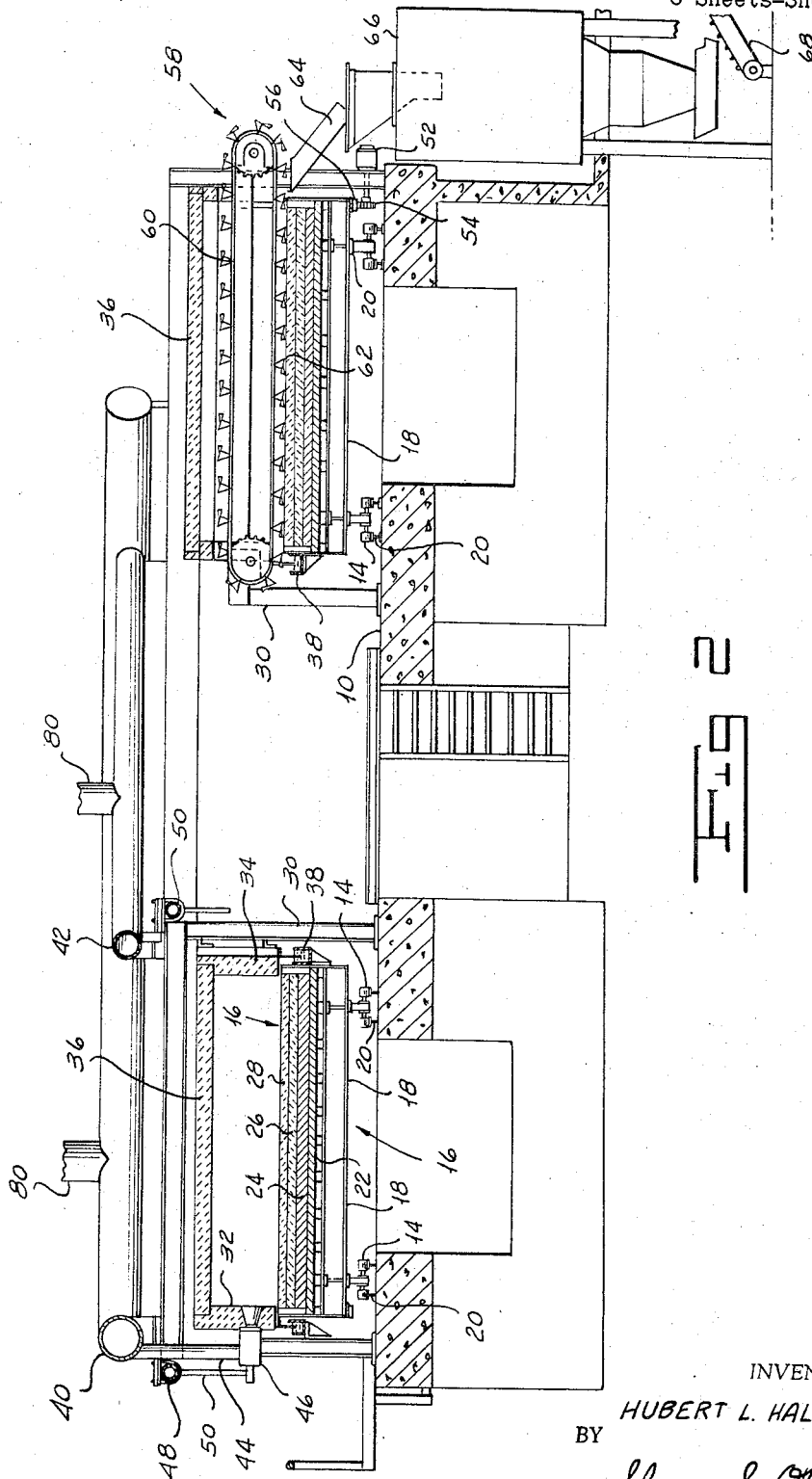
FIGURE 2 is a sectional view of the form of my apparatus shown in FIGURE 1 taken along the line 2—2 of FIGURE 1 with parts removed for clarity in exposition.

Referring now to FIGURES 1 to 4 of the drawings, my apparatus is supported on a floor 10. The hearth, indicated generally by the reference character 16, of my apparatus has brackets 12 carrying rollers 14. These rollers ride on tracks 20 on the floor 10. The frame 18 of the hearth 16 supports two layers of steel 22 and 24 and layers 26 and 28 of a suitable refractory material, the upper layer 28 of which is to receive the limestone to be calcined in a manner to be described. A supporting framework 30 carries a housing comprising side walls 32 and 34 and a top wall 36 made from a suitable refractory material. I provide a mercury seal 38 between the housing and the hearth 16 to prevent the escape of the gases of combustion. Respective main supply conduits 40 and 42 carry air to pipes 44 leading to burners 46 in the walls 32 and 34 of the housing. Supply lines 48 and 50 carrying a suitable combustible gas are connected by pipes 50 to the burners 46 so that the burners are supplied with gas and air to provide the heat required to calcine the limestone.

A motor 52 carried by the floor 10 drives a gear 54 which engages an annular rack 56 on the hearth 16 to rotate the hearth. In response to energization of the motor 52, hearth 16 is driven in the direction of the Arrow A in FIGURE 1 to carry the limestone from the location to be described hereinafter at which it is deposited on the hearth through the calcining zones and ultimately to a discharge conveyor, indicated generally by the reference character 58. Conveyor 58 comprises an endless chain 60 which is driven by any suitable means known to the art. As the conveyor is driven, pushers 62 on the conveyor scrape the calcined limestone off the hearth and deliver it to a chute 64 down which the lime passes to a cooling chamber 66. A suitable conveyor 68 may be employed to carry the lime from the cooling chamber 66 to a suitable storage location. A conduit 69 connects the cooling chamber 66 to a separator 70 which prevents reentry of dust into the system. A combustion air fan 72 is adapted to be driven by a motor 74 through a chain 76. Fan 72 delivers air to distribution ducts 78 and 80 which supply the air lines such as the lines 40 and 42.

Referring now to FIGURES 2 to 5, my apparatus comprises a preheating tower, indicated generally by the referecne character 82, having a wall made up of a layer 84 of extra strength castable material and an outer covering 86 of block insulation. I provide the upper end of the tower 82 with an inlet 88 through which limestone to be calcined is delivered to the tower storage area, indicated generally by the reference character 90. I mount a plurality of groups indicated generally by the reference characters 92, 94, 96, 98 and 100 of heat exchange tubes 102 within the tower below the supply area 90 so that limestone can pass downwardly from the supply area 90 and through the heat exchange tubes 102. In order to ensure a proper distribution of limestone on the annular hearth, the outboard group 92 has a greater number of tubes 102 than does the inboard group 100. As can be seen by reference to FIGURES 7 and 8, I provide each of the tubes 102 with a plurality of fins 104 extending radially outwardly and along the length of each tube. For example, I may employ eight fins spaced around the periphery of each tube. As will be explained hereinafter, fins 104 provide good heat exchange between the tubes 102 and the surrounding exhaust gases. The heat exchange tubes 102 provide a preliminary heat exchange zone wherein the gases are at a temperature of below about 650° F. as will be described hereinafter.

I form each of the tubes 102 with an outwardly extending projection 101 which may be termed a stone "turnover box" to assist in preventing stones from clogging the tubes. As will be apparent from the showing of FIGURES 3, 4 and 8, boxes 101 extend outwardly of the tubes 102 at the upper ends of the boxes and then taper inwardly toward the tube walls at the lower ends of the boxes. Thus, stones traveling down the tubes are permitted to tumble in the region of the boxes thus to avoid clogging of the tubes. Between each group of adjacent tubes 102, I position adjustable baffles 103 supported on the fins to direct the exhaust gases toward the fins to enhance the heat exchange between the gases and the fins. Referring to FIGURES 3 to 6, after leaving the tubes 102, the limestone which has received its first preheating is delivered to an area, indicated generally by the reference character 106, where it is further preheated in a manner to be described. A plurality of hoppers 108 disposed below area 106 and spaced across the bottom of the tower 82 are connected by passages 110 to respective limestone distributors 112. Thus, after passing through the heat exchange tubes 102 to the area 106 the limestone is funneled through hoppers 108 and passages 110 to the distributing head 112 which distributes a relatively thin layer of limestone on the moving hearth 16.

I provide the tower 82 with an opening 114 leading into the lower end of the area 106. A flue 116 extending through the upper wall 36 of the housing is adapted to conduct exhaust gases to the opening 114. A plurality of respective pipes 118 extend through the tower wall to open into the spaces between the groups of heat exchange tubes 102. I connect all the pipes 118 to a manifold 120. An exhaust duct 122 connects the manifold 120 to an exhaust fan 124. It will readily be apparent that when the exhaust fan 124 is driven, it draws the exhaust gases from within the housing formed by walls 32, 34 and 36 and hearth 16 through the flue 116 and through opening 114 so that the exhaust gases first pass upwardly through the area 106 and then through the spaces occupied by tubes 102 out through pipes 118, through manifold 120 and through duct 122 and fan 124 to the atmosphere.

As is explained hereinabove, the exhaust gases entering the flue 116 are at a temperature of about 1000° F. Moreover, in accordance with my invention I have discovered that if exhaust gases at a temperature of greater than 650° F. are brought into contact with the limestone calcined, then the resulting lime has a very low sulphur content. If, on the other hand, exhaust gases at a temperature of less than about 650° F. are brought into contact with the limestone, the resulting lime has an excessively high sulphur content. It will be apparent that as the exhaust gases travel upwardly through the tower 82, the temperature thereof is gradually reduced. I so select the length of the tubes 102 and so position them in the tower 82 that the exhaust gases which actually contact the limestone in the zone 106 below the tubes 102 are at a temperature of above about 650° F. Moreover, the length of the tubes 102 is so selected that substantially all of the useful heat of the exhaust gases is applied to the limestone.

Owing to the heat exchange between tubes 102 and the gases and the tubes 102 and the limestone passing therethrough, the heat of the gas is transferred to the limestone without any actual contact between the limestone and the gas. Owing to the fact that an exhaust pressure is provided, substantially all of the gas passages upwardly through the space outside the heat exchange tubes and substantially no gas enters into and passes upwardly through the tubes.

In the practice of my process, with the apparatus shown in the drawings, as the hearth 16 rotates the distributors 112 distribute a thin layer of preheated limestone on the hearth. The exhaust fan 124 draws exhaust gases from the hearth housing through the flue 116 and through openings 114 into the zone 106 to bring the exhaust gases directly into contact with the limestone in that zone. As the exhaust gases travel upwardly through the tower 82, their temperature gradually decreases. I position the lower ends of the tubes 102 so that the temperature of the gas in the zone 106 is above about 650° F. As the gas leaves the zone 106, baffles 103 direct the gas into heat exchange relationship with the fins 104 on tubes 102, thus to heat the stone passing downwardly through the tubes without coming into direct contact therewith. I construct the tubes 102 of such a length that substantially all of the useful heat of the exhaust gas is employed to preheat the limestone.

After the limestone has been deposited on the moving hearth, it is carried through the calcining zone and the hot gases of combustion produced by the burners 46 reduce the limestone to lime. When the hearth arrives at the discharge station, the conveyor 60 scrapes the lime off the conveyor and delivers it to chute 64 down which it passes into the cooler 66. From the cooler it may be carried to a suitable storage location by the conveyor 58. The duct 69 connects the cooler to a separator 70 which removes the dust. Air from the separator is driven by the fan 72 into the distributing conduits 78 and 80. By practicing my method in the manner described above, I produce lime having a sulphur content of about 0.008% by weight of the lime. It will readily be apparent that this lime is eminently suitable for use in the oxygen lance method of making steel.

It will be seen that I have accomplished the objects of my invention. I have provided a method for calcining limestone which is more efficient than are methods of the prior art. My method permits production of lime having a very low sulphur content while at the same time preventing spalling or cracking of the limestone. My method produces lime which is eminently suitable for use in the oxygen lance method for producing lime.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a process for calcining limestone the steps of feeding a charge consisting of limestone to a calcining hearth through elongated confined zones, first preheating the charge while passing through said zones by indirect heat exchange with exhaust gases at a temperature below about 650° F. and then preheating said charge by direct heat exchange with exhaust gases at a temperature of above about 650° F., the process being such that lime having a sulphur content of less than about 0.03% by weight is produced.

2. In a process for calcining limestone the steps of feeding a charge consisting of limestone through elongated confined zones to a calcining hearth, first preheating the charge while passing through said zones by indirect heat exchange with exhaust gas at a temperature below about 650° F. and then preheating said charge by direct heat exchange with exhaust gas at above said temperature, said exhaust gas traveling generally countercurrent to the travel of the charge, the process being such that lime having a sulphur content of less than about 0.03% by weight is produced.

3. In a process for calcining limestone the steps of feeding a charge consisting of limestone through elongated confined zones to a hearth and preheating the charge while passing through said zones by indirect heat exchange with exhaust gas of said process at a temperature below about 650° F., the process being such that lime having a sulphur content of less than about 0.03% by weight is produced.

4. In a process of calcining limestone the steps of feeding a charge consisting of limestone through elongated confined zones countercurrent to hot exhaust gases and heating the limestone first by indirect heat exchange at a temperature below about 650° F. with said gases while in said elongated confined zones and then by direct contact with exhaust gases above about said temperature, the process being such that lime having a sulphur content of less than about 0.03% by weight is produced.

5. Apparatus for feeding limestone to the hearth of calcining apparatus including in combination a tower disposed over said hearth, the base of said tower having means for passing limestone to said hearth, a plurality of heat exchange tubes adapted to pass limestone therethrough, said heat exchange tubes being provided with limestone turnover boxes projecting outwardly from said tubes adjacent their upper ends and tapering inwardly toward said tubes at the lower ends of the boxes, means mounting said tubes within said housing in an upper zone to pass limestone fed therethrough to a lower zone within said housing and means for directing exhaust gases from the hearth through said lower and upper zones.

6. Apparatus for feeding limestone to the hearth of calcining apparatus including in combination a tower disposed over said hearth, the base of said tower having means for passing limestone to said hearth, a plurality of heat exchange tubes adapted to pass limestone therethrough, means mounting said tubes within said housing in an upper zone in a plurality of spaced groups to pass limestone fed therethrough to a lower zone within said housing, means for directing exhaust gases from the hearth successively through said lower and upper zones and a plurality of baffles disposed between said groups for directing said exhaust gas into heat exchange relationship with said tubes.

7. Apparatus for feeding limestone to the hearth of calcining apparatus including in combination a housing disposed over said hearth, a heat exchange tube adapted to pass limestone therethrough, means mounting said heat exchange tube in said housing in a first zone to pass a charge of limestone to a second zone within said housing, a limestone turnover box along the length of said tube, said box extending generally laterally outwardly from said tube adjacent the upper end of the box and tapering inwardly toward said tube adjacent the lower end of the box and means for directing exhaust gas successively through said second and first zones to bring said gas into direct heat exchange relationship with said limestone in said second zone and into heat exchange relationship with said tube in said second zone indirectly to heat said limestone in said first zone.

References Cited

UNITED STATES PATENTS

| 1,844,407 | 2/1932 | Murray | 165—183 |
| 2,157,321 | 5/1939 | Bussmeyer | 263—53 X |
| 2,185,930 | 1/1940 | Simpson et al. | 165—183 X |
| 2,634,842 | 4/1953 | Caylor | 222—459 X |
| 3,030,090 | 4/1962 | Johnson | 263—28 |
| 3,074,707 | 1/1963 | Humphries et al. | 263—53 |

FREDERICK L. MATTESON, Jr., *Primary Examiner.*

JOHN J. CAMBY, *Examiner.*